(12) United States Patent
Usoro (10) Patent No.: US 8,444,527 B2
(45) Date of Patent: May 21, 2013

(54) VARIABLE-SPEED MOTOR-GENERATOR ACCESSORY DRIVE SYSTEM

(75) Inventor: Patrick B. Usoro, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 746 days.

(21) Appl. No.: 12/560,732

(22) Filed: Sep. 16, 2009

(65) Prior Publication Data

US 2011/0065543 A1    Mar. 17, 2011

(51) Int. Cl.
  *B60K 1/02*   (2006.01)

(52) U.S. Cl.
  USPC .................................................. 477/3; 475/5

(58) Field of Classification Search
  USPC ................... 477/3; 475/5, 210, 297, 286, 287
  See application file for complete search history.

(56) References Cited

U.S. PATENT DOCUMENTS

| | | | | |
|---|---|---|---|---|
| 7,753,147 B2* | 7/2010 | Usoro | .......................... | 180/53.8 |
| 7,846,051 B2* | 12/2010 | Holmes et al. | ..................... | 475/5 |
| 2008/0179119 A1* | 7/2008 | Grenn et al. | .................. | 180/65.2 |
| 2009/0176611 A1* | 7/2009 | Avery | ................................. | 475/5 |
| 2010/0035716 A1* | 2/2010 | Smith et al. | ....................... | 475/5 |

FOREIGN PATENT DOCUMENTS

DE    102006037576    *    4/2008

* cited by examiner

*Primary Examiner* — Justin Holmes
*Assistant Examiner* — Stacey Fluhart
(74) *Attorney, Agent, or Firm* — Quinn Law Group, PLLC (57) ABSTRACT

An accessory drive system for a motor vehicle is provided including first and second gear sets having first, second, and third members configured to selectively connect vehicle accessories to an engine and motor/generator. The first member of each gear set is continuously interconnected to the other. The second member of each gear set is continuously interconnected to the other. The motor/generator is configured to drive the accessories at a selectable rate independent of engine speed. A first torque transmitting device is operatively connected to the gear sets to allow the motor/generator to re-start the engine and power the accessories while restarting the engine. A second torque transmitting device is operatively connected to the engine's output shaft to allow the motor/generator to power the accessories while the vehicle is off.

12 Claims, 5 Drawing Sheets

VARIABLE-SPEED MOTOR-GENERATOR ACCESSORY DRIVE SYSTEM

TECHNICAL FIELD

The present invention pertains generally to variable-speed motor-generator type accessory drive systems for motorized vehicles.

BACKGROUND OF THE INVENTION

In conventional motor vehicles, i.e., automobiles propelled solely by an internal combustion engine, vehicle accessories such as hydraulic pumps, water pumps, vacuum pumps, and heating, ventilation, and air conditioning (HVAC) compressors are powered directly from the internal combustion engine. The power requirements of these accessories may be steady over extended periods of time, as in the case of water pumps used to help cool the engine, or may be required in short bursts, as in the case of hydraulic accessories or air brakes. Regardless, accessory speed is typically proportional to engine speed despite the varying power demand of the accessories.

Conventional automotive accessory drive systems include a drive pulley connected to the engine's crankshaft. A flexible chain or belt couples the drive pulley with a plurality of driven pulleys that are each operatively connected to an individual accessory. In hybrid vehicles which employ an internal combustion engine with one or more electric motors for propulsion, either in series or in parallel, these same accessories are often powered from the internal combustion engine in much the same manner as in conventional motor vehicles, but are sometimes driven by individual electric motors.

Since the drive pulley and belt are actuated directly by the crankshaft, they are necessarily subject to engine speed variations during vehicle acceleration and deceleration. In other words, the operating speeds of the accessories in such conventional drive systems are directly proportional to the speed of the engine. Since the engine operates over a wide speed range (e.g., from as low as 500 rpm at idle to as high as 8,000 rpm at full capacity), the accessories are typically designed to be fully functional at the low end of the engine speed range in order to ensure that they can remain operational. Consequently, when the engine is operating at higher speeds, conventional accessory drive systems may transfer more energy to the accessories than necessary to provide adequate function.

The above discussed matter is further complicated for hybrid vehicles with an engine stop-start feature because, under certain operating conditions the engine is shut down to save fuel, yet the accessories need to remain operational. Further, for a belt-alternator-starter type hybrid, it is desirable to be able to start the engine with the alternator-starter without impacting the operation of the accessories.

SUMMARY OF THE INVENTION

Provided herein is a variable-speed motor-generator accessory drive system for a motorized vehicle, preferably of the hybrid type. The accessory drive system described below enables vehicle accessories to be driven primarily by engine power, enables the accessories to be driven at a controllable speed that is independent of the engine speed, can drive the accessories when the engine is off, can start the engine without significantly impacting the operating speed of the accessories, can generate electric power, and can assist in driving the vehicle.

The accessory drive system includes an engine, a motor/generator, one or more vehicle accessories, first and second gear sets, and first and second torque transmitting devices. The first and second gear sets each have first, second, and third members. The first member of the first gear set is continuously interconnected with the first member of the second gear set. Similarly, the second member of the first gear set is continuously interconnected with the second member of the second gear set. The engine has an engine output shaft that is operatively connected to at least one member of the first and second gear sets to permit power from the engine to be transferred through the first and second gear sets to drive the various vehicle accessories. Preferably, a plurality of pulleys is configured to transfer power from the engine to the various vehicle accessories.

The motor/generator is connected to one of the members of the first and second gear sets that is not connected to the output shaft of the engine. Power from the motor/generator can be transmitted to the accessories by a shaft, a belt and pulley assembly, a chain and sprocket assembly, a third gear set, or combination thereof. The motor/generator is configured to drive the various accessories at a selectable rate independent of engine speed, including while the engine is off.

The first torque transmitting device, which is preferably a selectively engageable brake, is operatively connected to one of the members of the first and second gear sets other than the members of the gear sets operatively connected to the engine and the motor/generator, and configured to allow the motor/generator to re-start the engine and simultaneously power the various accessories. The second torque transmitting device, which is preferably either a one-way clutch or selectively engageable brake, is operatively connected to the engine output shaft, but is not operatively connected to the members of the first and second gear sets that are operatively connected to the first torque transmitting device or the motor/generator. The second torque transmitting device is configured to allow the motor/generator to power the accessories at a selectable rate while the engine is in an off-state. Ideally, the first torque transmitting device is a selectively engageable brake, whereas the second torque transmitting device is a one-way clutch. Alternatively, the first and second torque transmitting devices can both be selectively engageable brakes.

The first and second gear sets are preferably in the nature of planetary gear sets wherein the first, second, and third members are either a ring gear member, a sun gear member, a planet carrier assembly or a long-pinion gear, in any order. Notably, the planet carrier assembly can be either a single-pinion carrier assembly or a double-pinion carrier assembly. In a similar regard, the pinion gears rotatably mounted to the carrier assemblies of the first and second gear sets can be either short- or long-pinion type gears.

It is also preferred that the accessory drive system also includes a third torque transmitting device. In this preferred embodiment, the third torque transmitting device is either a one-way clutch or a selectively engageable clutch operatively connected to at least two members of the first and/or second gear sets. The third torque transmitting device is configured to enable the engine to power the accessories directly without power input from or input to the motor/generator. This aspect allows the use of a motor/generator of limited size since the third torque transmitting device can be configured to lock the gear sets at high engine speeds when the power requirements of the motor/generator would be high, albeit limiting the energy savings at high engine speeds.

Optimally, the accessory drive system will also include a controller operatively connected to the engine and the motor/generator. The controller is configured to control the speed at which the accessories are run and to calculate speed and output torque values for the motor/generator in order to optimize the speed at which the accessories are run, thereby further reducing parasitic energy consumption.

It is even further preferred that the accessory drive system also includes an energy storage device, such as a battery, operatively connected to the motor/generator. The energy storage device is configured to supply power to and/or receive power from the motor/generator.

The above features and advantages, and other features and advantages of the present invention will be readily apparent from the following detailed description of the preferred embodiments and best modes for carrying out the invention when taken in connection with the accompanying drawings.

DESCRIPTION OF THE PREFERRED EMBODIMENTS

Figure 1:
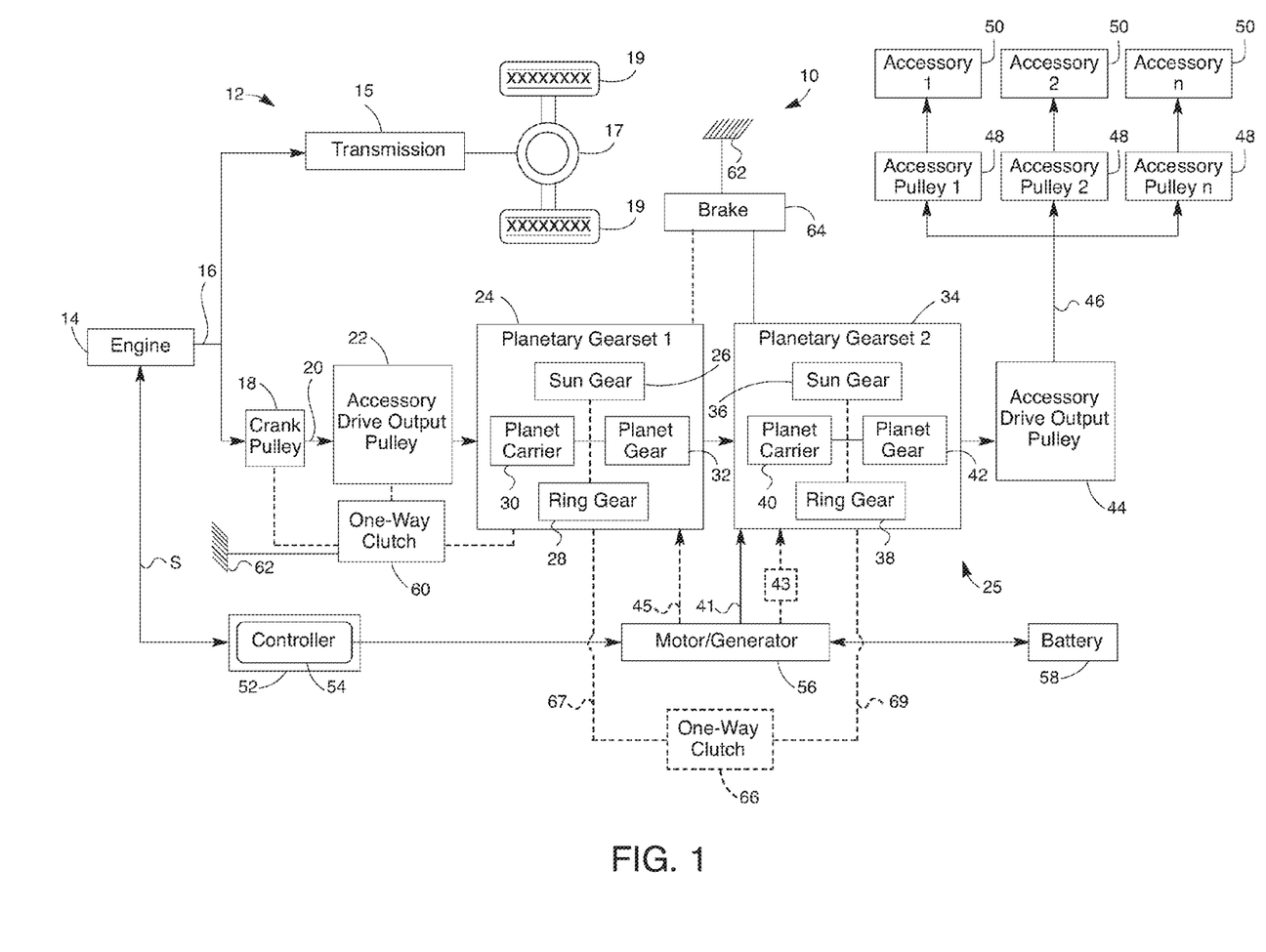
FIG. 1 is a schematic illustration depicting a variable-speed motor-generator type accessory drive system in accordance with the present invention.

Referring to the drawings, wherein like reference numbers refer to the same or similar elements throughout the several views, FIG. 1 is a schematic representation of a variable-speed motor/generator type accessory drive system, shown generally at 10 (hereinafter "accessory drive system"), for a motorized vehicle. The accessory drive system 10 is preferably incorporated into a hybrid vehicle, such as hybrid vehicle 12 of FIG. 1, but can also be incorporated into other types of vehicles (e.g., internal combustion engine automobiles, etc.) across various platforms (e.g., passenger car, light truck, heavy duty, and the like). The types of vehicle accessories that may be driven using the accessory drive system 10 of the present invention includes compressors, such as pneumatic brake compressors or HVAC compressors, hydraulic pumps, such as those used for power steering or other heavy duty hydraulic equipment, water pumps, and vacuum pumps.

The accessory drive system 10 includes a restartable engine 14 configured to transmit power, preferably by way of torque, to a crank pulley 18 via an engine output shaft, such as crankshaft 16. A first belt 20 couples the crank pulley 18 with an accessory drive input pulley 22. The accessory drive input pulley 22 is operatively connected to a differential transmission, identified generally as 25 in FIG. 1 and defined herein by a plurality of gear trains, preferably in the nature of first and second planetary gear sets 24, 34, respectively.

The first planetary gear set 24 employs an outer gear member, typically designated as the ring gear 28. The ring gear member 28 circumscribes an inner gear member, typically designated as the sun gear 26. A carrier member, such as planet carrier assembly 30, rotatably supports a plurality of planet gears 32 (also referred to in the art as pinion gears) such that each of the planet gears 32 meshingly engage the outer, ring gear member 28 and/or the inner, sun gear member 26 of the first planetary gear set 24. It should be understood that the planet carrier assembly 30 of the first planetary gear set 24 may be of the single- or the double-pinion carrier type, without departing from the intended scope of the present invention. In a similar regard, the planet gears 32 may be of the short-pinion or the long-pinion gear type.

Similar to the first planetary gear set 24, the second planetary gear set 34 employs an outer gear member, such as ring gear 38, which circumscribes an inner gear member, such as sun gear 36. A carrier member, such as planet carrier assembly 40, rotatably supports a plurality of planet gears 42 such that each of the planet gears 42 meshingly engages the outer, ring gear member 38 and/or the inner, sun gear member 36 of the second planetary gear set 34. The planet carrier assembly 40 of the second planetary gear set 34 may be of the single- or the double-pinion carrier type, without departing from the intended scope of the present invention. Furthermore, the planet gears 42 may be of the short-pinion or the long-pinion gear type.

In a single-pinion carrier type (or "simple") planetary gear set, when the sun gear is held stationary or grounded and power is applied to the ring gear, the planet gears rotate in response to the power applied to the ring gear and thus "walk" circumferentially about the fixed sun gear to effect rotation of the carrier assembly in the same direction as the direction in which the ring gear is being rotated. Additionally, if two members of a simple planetary gear set rotate in the same direction and at the same speed, the third member is forced to turn at the same speed and in the same direction. For example, if the sun gear and ring gear rotate in the same direction and at the same speed, the planet gears do not rotate about their own axes but rather act as wedges to lock the entire unit together to effect what is known as direct drive—the single-pinion carrier rotates in unison with the sun and ring gears.

Whenever the single-pinion carrier assembly is grounded and power is applied to either the sun gear or the ring gear, the planet gears act as idlers—i.e., the driven member is rotated in the opposite direction as the drive member. By way of example, if a torque transfer device, such as a brake, is actuated to frictionally engage the single-pinion carrier and thereby restrain it against rotation, a clockwise application of torque to the sun gear will rotate the ring gear in the counterclockwise direction.

If the rotational speeds of any two members in a simple planetary gear set are known, then the speed of the third member can be determined using a simple rule: the rotational speed of the single-pinion carrier is proportional to the speeds of the sun and the ring gears as weighted by their respective numbers of teeth. For example, if the ring gear has twice as many teeth as the sun gear in the same set, the speed of the carrier is the arithmetic sum of two-thirds the speed of the ring gear and one-third the speed of the sun gear. If one of the three members rotates in an opposite direction, the arithmetic sign is negative for the speed of that member in any corresponding mathematical calculation.

In a double-pinion carrier type (or "compound") planetary gear set, e.g., one having meshing inner and outer sets of planet gears, the roles of the ring gear and the double-pinion carrier assembly are effectively exchanged in comparison to a simple planetary gear set. By way of example, if the sun gear were to be held stationary and the ring gear is driven, then the double-pinion carrier turns in the same direction as the rotating ring gear. On the other hand, if the sun gear were to be held stationary and the compound carrier were to be driven, then the inner set of planet gears roll or "walk" along the sun gear, turning in the same direction that the double-pinion carrier is rotating. The outer set of planet gears on the compound carrier will turn in the opposite direction, thus forcing a meshing ring gear to turn in the opposite direction, but only with respect to the planet gears with which the ring gear is meshingly engaged.

In a compound planetary gear set, the speed of the ring gear is proportional to the speeds of the sun gear and the planet carrier, weighted by the number of teeth on the sun gear and the number of teeth filled by the planet gears, respectively. If the carrier in such a compound planetary gear set were to be held stationary and the sun gear were to be rotated, then the ring gear will rotate with less speed and in the same direction as the sun gear. If the ring gear of a simple planetary gear set is held stationary and the sun gear is rotated, then the carrier supporting a single set of planet gears will rotate with less speed and in the same direction as the sun gear.

The differential transmission 25, e.g., first and second planetary gear sets 24, 34, is configured to convert the rotational speed and power of the accessory drive input pulley 22, which runs at a fixed ratio of engine speed, to predetermined values selected to efficiently drive a plurality of vehicle accessories 50. In other words, the planetary gear sets 24, 34 selectively increase or decrease the magnitude of torque transmitted from the accessory drive input pulley 22 to the accessories 50 to more closely coincide with the actual power requirements of the accessories 50, thereby minimizing parasitic energy losses over traditional accessory drive systems.

Power from the first and second planetary gear sets 24, 34 is transferred to an accessory drive output pulley 44. A second belt 46 couples the accessory drive output pulley 44 with one or more accessory pulleys 48. The accessory pulleys 48 are each operatively connected to respective one of the plurality of vehicle accessories 50. Notably, the various input and output pulleys and corresponding belts described herein can be replaced by connecting shafts, chain and sprocket assemblies, or intermeshing gears without departing from the scope and intent of the present invention.

The engine 14 also transfers torque via the crankshaft 16 to a transmission 15. The transmission 15 manipulates and distributes power from the engine 14 to a final drive system, represented herein by differential 17 and wheels 19, thereby configured to propel the hybrid vehicle 12. In the embodiment depicted, the engine 14 may be a fossil fuel engine, such as a 3-stroke diesel engine or a 4-stroke gasoline engine, which is readily adapted to provide its available power output typically delivered at a number of revolutions per minute (RPM). Although not depicted in FIG. 1, it should be appreciated that the final drive system may comprise any known configuration, e.g., front wheel drive (FWD), rear wheel drive (RWD), four-wheel drive (4WD), or all wheel drive (AWD). Thus, the accessory drive system 10 of the present invention is not intended to be restricted to the exemplary vehicle configuration set forth in FIG. 1.

Still referring to FIG. 1, the accessory drive system 10 also includes a motor/generator 56, preferably configured to selectively operate as a motor or a generator. For instance, the motor/generator 56 is configured to selectively transfer power (ideally by way of torque) to and/or receive power from the differential transmission 25, either directly, e.g., via shaft 41, or through an off-set drive, such as a belt, chain, intermeshing gears, additional differential gear set, or combinations thereof (represented collectively in phantom at 43 in FIG. 1.) The motor/generator 56 may additionally or alternatively be configured to selectively transfer torque to and/or receive torque from the first planetary gear set 24, either directly or through an off-set drive, the interconnection between the motor/generator 56 and first planetary gear set 24 depicted generally in phantom as 45. The motor/generator 56 is further configured to receive power from and/or transfer power to a storage device, such as battery 58 or a fuel cell, capacitor, fly wheel, and the like. Additionally, the motor/generator 56 can be turned off to reduce rotational resistance for improved fuel economy.

The motor/generator 56 is continuously controllable to drive the accessories 50 at variable speeds regardless of the speed of the engine 14. By transferring a first predetermined amount of input torque from the engine 14 to one of the members of the planetary gear sets 24, 34, and transferring a second predetermined amount of input torque from the motor/generator 56 to another one of the members of the planetary gear sets 24, 34, the differential transmission 25 can be controlled to produce a selectable amount of output torque from yet another of its members. Therefore, by controlling the status of the motor/generator 56 (i.e., either "motor", "generator", or "off"), and by manipulating the amount of torque transferred from the motor/generator 56 to the planetary gear sets 24, 34, the output speed transmitted to the accessory drive output pulley 44 is selectable within an operational range. Significant fuel economy gains are realized when the speeds of the accessories 50 are controlled to be independent of the engine speed.

The accessory drive system 10 also includes a controller, depicted in FIG. 1 in an exemplary embodiment as a microprocessor based electronic control unit (ECU) 52, having programmable memory 54. The engine 14 and the motor/generator 56 are operatively connected to the controller 52 (e.g., via electric cables, fiber optic cables, radio frequency or other wireless technology, etc.) The controller 52 is configured or programmed to control the operation of the engine 14 and motor/generator 56. For instance, the controller 52 is preferably configured to receive input, such as sensor signals S, from the engine 14 indicating the current engine speed and/or state (e.g., on-state or off-state.) The controller 52 will responsively determine or calculate a corresponding speed or torque value for the motor/generator 56 that is required to produce an optimized output speed from the differential transmission 25. As an example, if the engine 14 is running at 4,000 rpm and the accessories 50 are optimized to run at 1,500 rpm, the controller 52 calculates the speed of the motor/generator 56 required to produce an output speed of 1,500 rpm based upon the respective gear ratio and arrangement of the first and second planetary gear sets 24, 34. After completing the calculation, the controller 52 commands the motor/generator 56 to transfer the required amount of torque to the planetary gear sets 24, 34 such that the accessories 50 are driven in an optimally efficient manner. The preferred gear ratio of the first planetary gear set 24 (e.g., ring gear 28 to sun gear 26) is in the range 1.5 to 3.0, and the preferred gear ratio of the second planetary gear set 34 (e.g., ring gear 38 to sun gear 36) is also in the range 1.5 to 3.0

The motor/generator 56 is also controllable to drive the accessories 50 when the engine 14 is in an off-state—the accessories 50 remain fully operational even when the hybrid vehicle 12 is being powered exclusively by an alternate power source (e.g., motor/generator 56, or additional motor/generators, not shown herein) in order to conserve fuel. Advantageously, the motor/generator 56 is also configured to re-start the engine 14, can power the accessories 50 when the engine 14 is being re-started such that there is no interruption in operation of the accessories 50. More precisely, by controlling the motor/generator 56, output therefrom is transferable to the accessories 50 such that the accessories 50 remain powered, and to the engine 14 such that the engine 14 is driven. As the engine 14 is being driven by the motor/generator 56, the controller 52 can introduce an engine spark (not shown) to re-start the engine 14. The above features will be explained in further detail hereinbelow.

According to the preferred embodiment of the present invention, the differential transmission 25 has four "nodes". As used herein, a node represents one or more planetary gear set members that are operatively constrained, e.g., through fixed interconnections, to continuously operate at the same rotational speed. In the present case, there are two planetary gear sets 24, 34 each having three members—e.g. sun gears 26, 36, ring gears 28, 38, and planet carrier assemblies 30, 40, respectively. In the preferred embodiment, a first member of the first planetary gear set 24 is continuously connected with a first member of the second planetary gear set 34. It is further preferred that a second member of the first planetary gear set 24 is continuously connected with a second member of the second planetary gear set 34. Consequently, there are four sets of planetary members that operate at the same rotational speed: two sets of fixed, continuously interconnected members, and two sets comprised of a single member of the first and second planetary gear sets 24, 34. Each set defines a node.

As will become more apparent from the embodiments depicted in FIGS. 2-9, it is preferred that one of the nodes of the differential transmissions defined therein be connected to the motor-generator. More over, the second node of the differential transmission is preferably connected with a first torque transmitting device 64. In a similar regard, the accessory drive input pulley (e.g., pulley 22, driven through the first belt 20 by the crank pulley 18 attached to the engine crankshaft 16) is preferably connected with the third node of the differential transmission. Finally, the accessory drive output pulley (e.g., pulley 44, which transfers power to the accessories 50 via accessory pulleys 48 through the second belt 46) is preferably connected to the fourth node of the differential transmission. The above features will be explained in further detail hereinbelow.

According to the preferred embodiment of the present invention, the first torque transmitting device 64 is a selectively engageable brake. The selectable brake 64 is operatively connected between a stationary member 62 (or ground), e.g. the transmission case, the chassis frame, or the vehicle body, and the differential transmission 25, e.g., a member of the planetary gear sets 24, 34. It should be appreciated, however, that alternate configurations may implemented for the first torque transmitting device.

The selectable brake 64 is configured to allow power to be transmitted from the motor/generator 56 to the engine 14 to start/re-start the engine 14, and enable the motor/generator 56 to drive the accessories 50 while re-starting the engine 14. To enable the controller 52 to introduce an engine spark necessary to re-start the engine 14, there must be a path to transmit power from the motor/generator 56, through the differential transmission 25, to the engine 14. In order to transmit torque through a planetary gear set from one member (the drive member) to another member (the driven member), the third member of that gear set must be constrained. Accordingly, the selectable brake 64 grounds the planetary member(s) attached to it, that is, force/constrain the member(s) to operate at the same rotational speed as a ground 62—zero speed, thereby providing the necessary path for transmitting power from the motor/generator 56 to both the engine 14 and the accessories 50.

A second torque transmitting device 60 is operatively connected between the ground 62, and either the crank pulley 18, the accessory drive input pulley 22, or the differential transmission 25, e.g., a member of the planetary gear sets 24, 34. According to a preferred embodiment of the present invention, the second torque transmitting device 60 is an over-running one-way clutch. It should be appreciated, however, that over-running one-way clutches are merely a preferred embodiment and that alternate configurations may be implemented for the second torque transmitting device as well. For example, according to an alternate embodiment, the one-way clutch 60 may be replaced with a selectively engageable brake (see brake 660 of FIG. 6.)

The one-way clutch 60 is implemented to allow the motor/generator 56 to efficiently power the accessories 50 when the engine 14 is off. It should be appreciated that without the one-way clutch 60, the motor/generator 56 may transfer a portion of its output torque back to the engine 14 when the engine 14 is off, and that the torque transferred back to the engine 14 could cause the engine to rotate backwards. Therefore, the one-way clutch 60 prevents the transfer of torque from the motor/generator 56 back to the engine 14 when off, and provides the reaction torque necessary to enable the motor/generator 56 to efficiently run the accessories 50.

An optional third torque transmitting device, such as one-way clutch 66 depicted in phantom in FIG. 1, is disposed between the third and fourth nodes of the differential transmission 25 (depicted generally by phantom lines 67 and 69.) The third torque transmitting device 66 may also be a selectively engageable rotating clutch (not shown.) As will be described in further detail below, the one-way clutch 66 is intended to prevent the third node from rotating faster than the fourth node, which enables the engine 14 to operate the accessories 50 at higher speeds without the need of electric power input from the motor/generator 56, thereby reducing the torque and power capacity requirement of the motor-generator 56 (i.e., allowing for a smaller, lighter, less expensive motor/generator assembly.) More specifically, the optional, one-way clutch 66 provides the means for causing the first and/or second planetary gear sets 24, 34 to operate as a single unit—all three members (e.g., the sun gear 26, ring gear 28, and planet carrier assembly 30) operating at the same rotational speed. In so doing, the accessory drive input pulley 22 (and thus the engine 14) is directly connected to the accessory drive output pulley 44, so the engine 14 can drive the accessories 50 directly without power from the motor/generator 56.

Having explained the various components and functionality of the accessory drive system 10, the precise interconnection of these components will now be described in accordance with a plurality of different embodiments. FIGS. 2-9 each illustrate a separate embodiment that functions similarly to the previously described accessory drive system 10, but includes, among other things, variations in the arrangements of the various torque transmitting devices and interconnections between the individual members of the first and second gear trains. Like reference numbers are used in FIGS. 2-9 to refer to like components from FIG. 1. As an example, the restartable engine 14 of FIG. 1 functions synonymously to the engines 214-914 of FIGS. 2-9, respectively. Therefore, unless specified otherwise, the components of FIGS. 2-9, identified with a base reference number preceded by one of the numbers "2" through "9", corresponding to that particular figure, should be considered to be identical to a respective component of FIG. 1, identified with a common base reference number. For example, the crank pulley is identified in FIG. 2 by reference numeral 218, in FIG. 3 by reference numeral 318, in FIG. 4 by reference numeral 418, in FIG. 5 by reference numeral 518, in FIG. 6 by reference numeral 618, in FIG. 7 by reference numeral 718, in FIG. 8 by reference numeral 818, and in FIG. 9 by reference numeral 918. The accessory pulleys are identified in FIG. 2 by reference numeral 248, in FIG. 3 by reference numeral 348, in FIG. 4 by reference numeral 448, in FIG. 5 by reference numeral 548, in FIG. 6 by reference numeral 648, in FIG. 7 by reference numeral 748, in FIG. 8 by reference numeral 848, and in FIG. 9 by reference numeral 948. Similarly, the second belt is identified in FIG. 2 by reference numeral 246, in FIG. 3 by reference numeral 346, in FIG. 4 by reference numeral 446, in FIG. 5 by reference numeral 546, in FIG. 6 by reference numeral 646, in FIG. 7 by reference numeral 746, in FIG. 8 by reference numeral 846, and in FIG. 9 by reference numeral 946.

Figure 2:
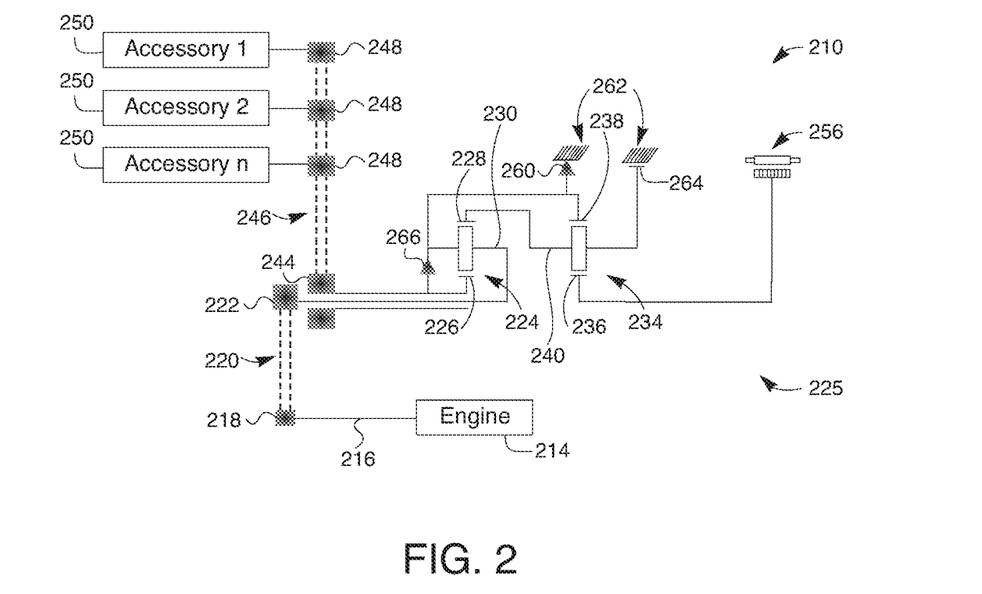
FIG. 2 is a schematic illustration of the accessory drive system of FIG. 1 in accordance with the preferred embodiment of the present invention.

Turning to FIG. 2, an accessory drive system 210 is shown in accordance with the preferred embodiment of the present invention. The accessory drive input pulley 222 (which runs at a fixed ratio of engine speed) is operatively connected to the planet carrier assembly 230, depicted in FIG. 2 as a single-pinion carrier, of the first planetary gear set 224. The motor/generator 256 is operatively connected to the sun gear 236 of the second planetary gear set 234. The ring gear 228 of the first planetary gear set 224 is continuously connected to the planet carrier assembly 240, depicted in FIG. 2 as a single-pinion carrier, of the second planetary gear set 234. Additionally, the planet carrier assembly 230 of the first planetary gear set 224 is continuously connected to the ring gear 238 of the second planetary gear set 234. Finally, the sun gear 226 of the first planetary gear set 224 is operatively connected to the accessory drive output pulley 244. Therefore, in response to input torque from the engine 214 (via the planet carrier assembly 230 of the first planetary gear set 224) and/or the motor/generator 256 (via the sun gear 236 of the second planetary gear set 234), the planetary gear sets 224, 234 can transfer power to the accessory drive output pulley 244 (via the sun gear 226 of the first planetary gear set 224) and thereby drive the accessories 250 at a selectable rate.

Still referring to FIG. 2, a first one-way clutch 260 is operatively connected to the ring gear 238 of the second planetary gear set 234 (and thus the planet carrier assembly 230, continuously connected thereto) and the stationary member 262 such that, when the engine 214 is in an off-state, the ring gear 238, and thus the accessory drive input pulley 222 and crankshaft 216 can be selectively restrained from rotating in a direction opposite of drive, and the motor/generator 256 can be implemented to drive the accessories 250 at a selectable rate. In addition, a selectable brake 264 is operatively connected to the planet carrier assembly 240 (and thus the ring gear 228, continuously connected thereto) and the stationary member 262 such that, when the engine 214 is in an off-state, the planet carrier assembly 240 can be selectively connected with ground, thus allowing power to be transmitted from the motor/generator 256 both to the accessory 250 (e.g. via sun gear 236, across ring gear 238, planet carrier assembly 230 and sun gear 226, and down pulley 244 and drive belt 246) and to the engine 214 (e.g., via sun gear 236, across ring gear 238 and planet carrier assembly 230, and down pulley 222 and drive belt 220) to fire the engine 214. Finally, a second one-way clutch 266 is disposed between the planet carrier assembly 230 and the sun gear 226, both of the first planetary gear set 224. By actuating the second one-way clutch 266, the first planetary gear set 224 is forced to rotate as a single unit, effectively connecting the engine 214 directly to the accessory drive output pulley 244, so that the engine 214 bypasses the differential transmission 225 and drives the accessories 250 directly without input from the motor/generator 256.

Figure 3:
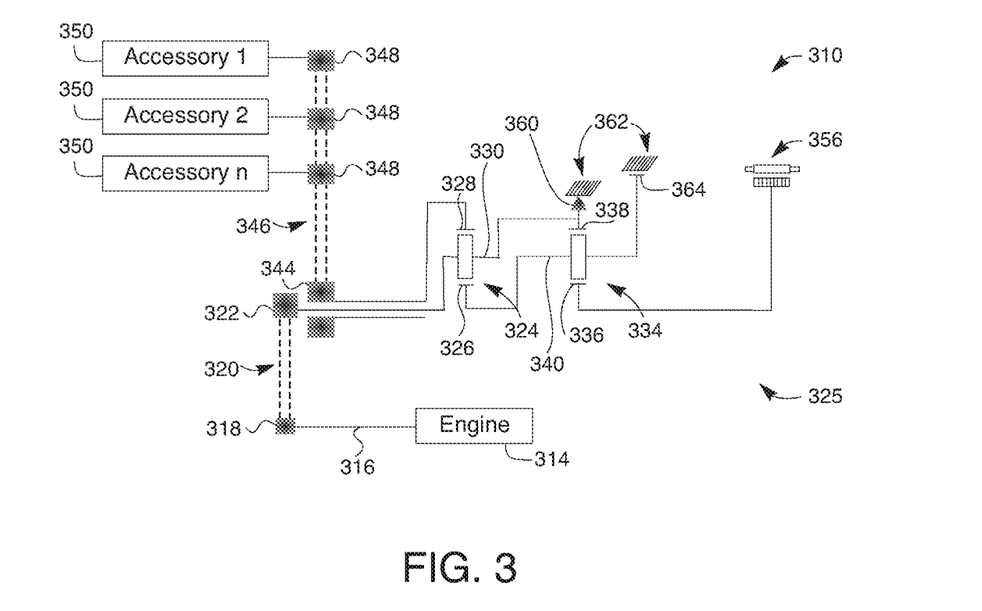
FIG. 3 is a schematic depiction of the accessory drive system of FIG. 1 in accordance with a first alternate embodiment of the present invention.

Referring now to FIG. 3, an accessory drive system 310 is shown in accordance with an alternate embodiment of the present invention. Similar to the embodiment of FIG. 2, the accessory drive input pulley 322 of FIG. 3 (which runs at a fixed ratio of engine speed) is operatively connected to the planet carrier assembly 330, depicted in FIG. 3 as a single-pinion carrier, of the first planetary gear set 324. The motor/generator 356 is operatively connected to the sun gear 336 of the second planetary gear set 334. The planet carrier assembly 330 of the first planetary gear set 324 is continuously connected to the ring gear 338 of the second planetary gear set 334, whereas the sun gear 326 of the first planetary gear set 324 is continuously connected to the planet carrier assembly 340, depicted in FIG. 3 as a single-pinion carrier, of the second planetary gear set 334. Finally, the ring gear 328 of the first planetary gear set 324 is operatively connected to the accessory drive output pulley 344. Therefore, in response to input torque from the engine 314 (via the carrier assembly 330) and/or the motor/generator 356 (via the sun gear 336), the differential transmission 325, defined by the planetary gear sets 324, 334, can transfer power to the accessory drive output pulley 344 (via the ring gear 328) and thereby drive the accessories 350 at a selectable rate.

Still referring to FIG. 3, a one-way clutch 360 is operatively connected to the ring gear 338 of the second planetary gear set 334 (and thus the planet carrier assembly 330, continuously connected thereto) and the stationary member 362 such that, when the engine 314 is in an off-state, the ring gear 338, and thus the accessory drive input pulley 322 and crankshaft 316 can be selectively restrained from rotating in a direction opposite of drive, and the motor/generator 356 can be implemented to drive the accessories 350 at a selectable rate. In addition, a selectable brake 364 is operatively connected to the planet carrier 340 of the second planetary gear set 334 (and thus the sun gear 324, continuously connected thereto) and the stationary member 362 such that, when the engine 314 is in an off-state, the planet carrier 340 can be selectively connected with ground, thus allowing power to be transmitted from the motor/generator 356 both to the accessory 350 (e.g. via sun gear 336, across ring gear 338, planet carrier assembly 330 and ring gear 328, and down pulley 344 and drive belt 346) and to the engine 314 (e.g., via sun gear 336, across ring gear 338 and carrier assembly 330, and down pulley 322 and drive belt 320) to fire the engine 314. Contrary to the embodiment provided in FIG. 2, the accessory drive system 310 of FIG. 3 does not include the optional third torque transmitting device (e.g., one-way clutch 266 of FIG. 2.)

Figure 4:
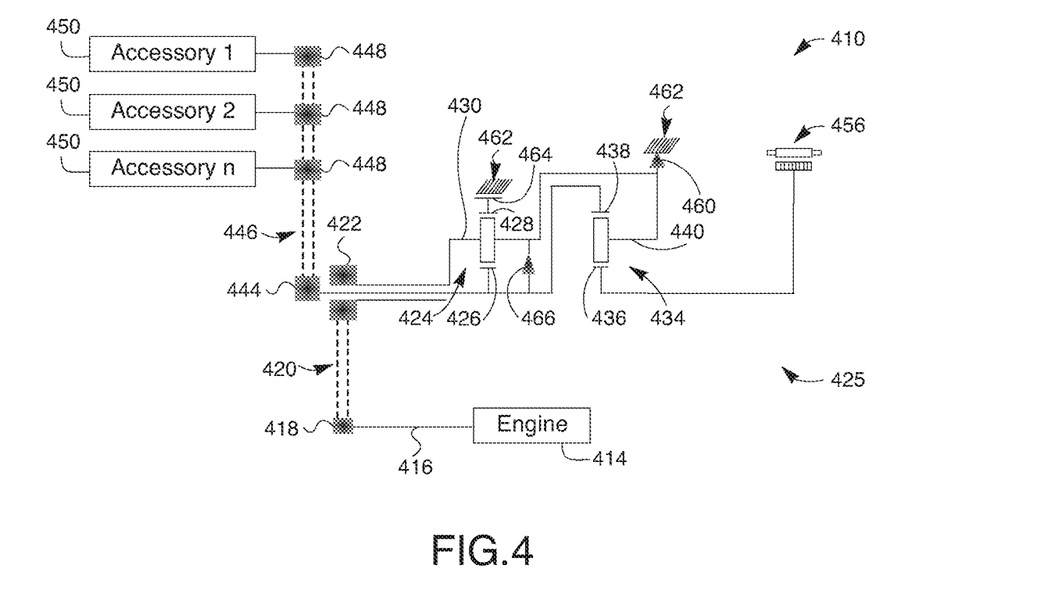
FIG. 4 is a schematic depiction of the accessory drive system of FIG. 1 in accordance with a second alternate embodiment of the present invention.

Turning to FIG. 4, an accessory drive system 410 is shown in accordance with another alternate embodiment of the present invention. The accessory drive input pulley 422 (which runs at a fixed ratio of engine speed) is operatively connected to the planet carrier assembly 430 of the first planetary gear set 424, which is depicted in FIG. 4 as a simple planetary gear set. The motor/generator 456 is operatively connected to the sun gear 436 of the second planetary gear set 434, which is also depicted in FIG. 4 as a simple planetary gear set. The sun gear 426 of the first planetary gear set 424 is continuously connected to the ring gear 438 of the second planetary gear set 434, whereas the planet carrier assembly 430 of the first planetary gear set 424 is continuously connected to the planet carrier assembly 440 of the second planetary gear set 434. Finally, the sun gear 426 of the first planetary gear set 424 is operatively connected to the accessory drive output pulley 444. Therefore, in response to input torque from the engine 414 (via the planet carrier assembly 430) and/or the motor/generator 456 (via the sun gear 436), the differential transmission 425 can transfer power to the accessory drive output pulley 444 (via sun gear 426) and thereby drive the accessories 450 at a selectable rate.

Still referring to FIG. 4, a first one-way clutch 460 is operatively connected to the planet carrier assembly 440 of the second planetary gear set 434 (and thus the planet carrier assembly 430, continuously connected thereto) and the stationary member 462. When the engine 414 is in an off-state, the planet carrier assembly 440, and thus the accessory drive input pulley 422 and crankshaft 416 can be selectively restrained via clutch 460 from rotating in a direction opposite of drive, and the motor/generator 456 can be implemented to drive the accessories 450 at a selectable rate. In addition, a second one-way clutch 466 is disposed between the carrier assembly 430 and the sun gear 426, both of the first planetary gear set 424. By actuating the second one-way clutch 466, the first planetary gear set 424 is forced to rotate as a single unit, thereby connecting the engine 414 directly to the accessory drive output pulley 444, so that the engine 414 can bypass the differential transmission 425 and drive the accessories 450 directly without torque input from the motor/generator 456.

A selectable brake 464 is operatively connected to the ring gear 428 of the first planetary gear set 424 and the stationary member 462. By selectively connecting the ring gear 428 with ground via brake 464 when the engine 414 is in an off-state, and constraining (e.g., continuously connecting) two sets of members of the first and second planetary gear sets 424, 434, namely the planet carrier assembly 430 to the planet carrier assembly 440 and the sun gear 426 to the ring gear 438, power can be transmitted from the motor/generator 456 to the engine 414 (e.g., via sun gear 436, across planet carrier assembly 440 and planet carrier assembly 430, and down pulley 422 and drive belt 420) to fire the engine 414.

Figure 5:
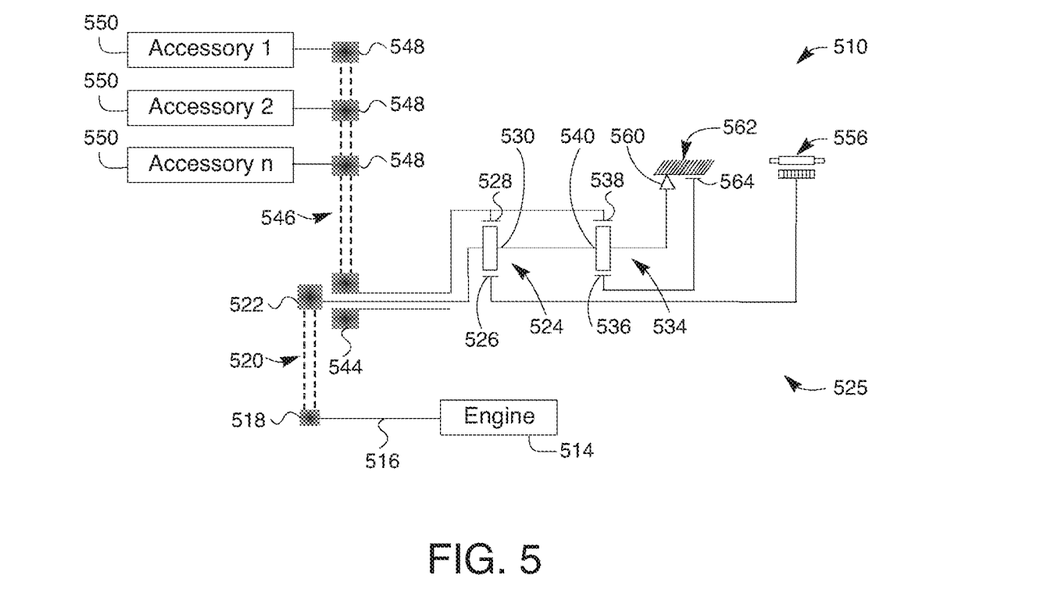
FIG. 5 is a schematic depiction of the accessory drive system of FIG. 1 in accordance with a third alternate embodiment of the present invention.

With reference to FIG. 5, an accessory drive system 510 is shown in accordance with yet another alternate embodiment of the present invention. The accessory drive input pulley 522 (which runs at a fixed ratio of engine speed) is operatively connected to the planet carrier assembly 530 of the first planetary gear set 524, which is depicted in FIG. 5 as a simple planetary gear set. The motor/generator 556 is operatively connected to the sun gear 526 of the first planetary gear set 524, which is also depicted in FIG. 5 as a simple planetary gear set. The ring gear 528 of the first planetary gear set 524 is continuously connected to the ring gear 538 of the second planetary gear set 534, whereas the planet carrier assembly 530 of the first planetary gear set 524 is continuously connected to the planet carrier assembly 540 of the second planetary gear set 534. Finally, the ring gear 528 of the first planetary gear set 524 is operatively connected to the accessory drive output pulley 544. Therefore, in response to input torque from the engine 514 (via the planet carrier assembly 530) and/or the motor/generator 556 (via the sun gear 526), the differential transmission 525 can transfer power to the accessory drive output pulley 544 (via the ring gear 528) and thereby drive the accessories 550 at a selectable rate.

Still referring to FIG. 5, a one-way clutch 560 is operatively connected to the planet carrier assembly 540 of the second planetary gear set 534 (and thus the planet carrier assembly 530, continuously connected thereto) and the stationary member 562 such that, when the engine 514 is in an off-state, the planet carrier assembly 540, and thus the accessory drive input pulley 522 and crankshaft 516 can be selectively restrained from rotating in a direction opposite of drive, functioning synonymously with respect to clutches 260, 360, 460 of FIGS. 2-4, respectively, and the motor/generator 556 can be implemented to drive the accessories 550 at a selectable rate. In addition, a selectable brake 564 is operatively connected to the sun gear 536 of the second planetary gear set 534 and the stationary member 562. By selectively connecting the sun gear 536 with ground via brake 564 when the engine 514 is in an off-state, and constraining (e.g., continuously connecting) two sets of members of the first and second planetary gear sets 524, 534, namely the planet carrier assembly 530 to the planet carrier assembly 540 and the ring gear 528 to the ring gear 538, power can be transmitted from the motor/generator 556 both to the accessory 550 (e.g. via sun gear 526, across ring gear 528, and down pulley 544 and drive belt 546) and to the engine 514 (e.g., via sun gear 526, across carrier assembly 530, and down pulley 522 and drive belt 520) to fire the engine 514. Contrary to the embodiments provided in FIGS. 2 and 4, the accessory drive system 510 of FIG. 5 does not include the optional third torque transmitting device (e.g., one-way clutch 266 and 466 of FIGS. 2 and 4, respectively.)

Figure 6:
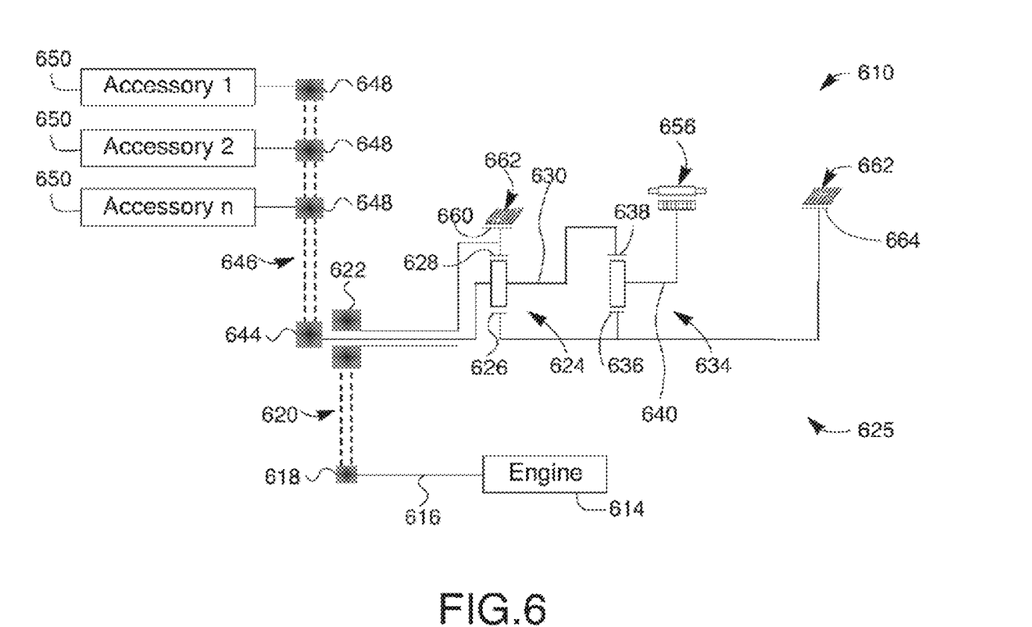
FIG. 6 is a schematic depiction of the accessory drive system of FIG. 1 in accordance with a fourth alternate embodiment of the present invention.

Turning to FIG. 6, an accessory drive system 610 is shown in accordance with yet another alternate embodiment of the present invention. The accessory drive input pulley 622 (which runs at a fixed ratio of engine speed) is operatively connected to the ring gear 628 of the first planetary gear set 624. The motor/generator 656 is operatively connected to the planet carrier assembly 640, depicted in FIG. 6 as a single-pinion carrier assembly, of the second planetary gear set 634. The sun gear 626 of the first planetary gear set 624 is continuously connected to the sun gear 636 of the second planetary gear set 634, whereas the planet carrier assembly 630 of the first planetary gear set 624 is continuously connected to the ring gear 638 of the second planetary gear set 634. Finally, the planet carrier assembly 630, depicted in FIG. 6 as a single-pinion carrier, of the first planetary gear set 624 is operatively connected to the accessory drive output pulley 644. Therefore, in response to input torque from the engine 614 (via ring gear 628) and/or the motor/generator 656 (via planet carrier assembly 640), the differential transmission 625, defined by the first and second planetary gear sets 624, 634, can transfer power to the accessory drive output pulley 644 (via planet carrier assembly 630) and thereby drive the accessories 650 at a selectable rate.

A first selectable brake 664 is operatively connected to the sun gear 636 of the second planetary gear set 634 and the stationary member 662. When the engine 614 is in an off-state, the planet carrier assembly 640 can be selectively connected with ground via brake 664, thus allowing power to be transmitted from the motor/generator 656 both to the accessory 650 (e.g. via planet carrier assembly 640, across ring gear 638 and planet carrier assembly 630, and down pulley 644 and drive belt 646) and to the engine 614 (e.g., via planet carrier assembly 640, across ring gear 638, carrier assembly 630, and ring gear 628, and down pulley 622 and drive belt 620) to fire the engine 614.

The primary purpose of FIG. 6 is to show that the second torque transmitting device, e.g., one-way clutch 260-560 of FIG. 2-5, respectively, can be comprised of a (second) selectively engageable brake 660. The second brake 660 is operatively connected to the ring gear 628 of the first planetary gear set 634 and the stationary member 662. When the engine 614 is in an off-state, the ring gear 628, and thus the accessory drive input pulley 622 and crankshaft 616 can be selectively grounded by the second brake 660, and the motor/generator 656 can be implemented to drive the accessories 650 at a selectable rate.

Figure 7:
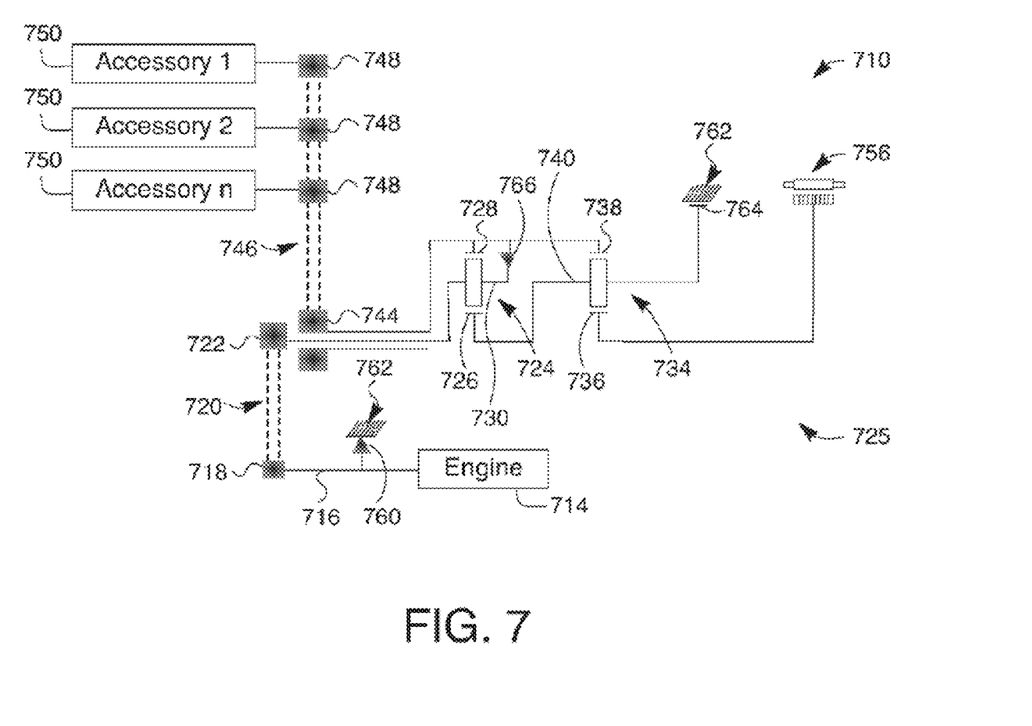
FIG. 7 is a schematic depiction of the accessory drive system of FIG. 1 in accordance with a fifth alternate embodiment of the present invention.

Turning to FIG. 7, an accessory drive system 710 is shown in accordance with yet another alternate embodiment of the present invention. The accessory drive input pulley 722 (which runs at a fixed ratio of engine speed) is operatively connected to the planet carrier assembly 730 of the first planetary gear set 724, which is depicted in FIG. 7 as a simple planetary gear set. The motor/generator 756 is operatively connected to the sun gear 736 of the second planetary gear set 734, which is also depicted in FIG. 7 as a simple planetary gear set. The sun gear 726 of the first planetary gear set 724 is continuously connected to the planet carrier assembly 740 of the second planetary gear set 734, whereas the ring gear 728 of the first planetary gear set 724 is continuously connected to the ring gear 738 of the second planetary gear set 734. Finally, the ring gear 728 of the first planetary gear set 724 is operatively connected to the accessory drive output pulley 744. Therefore, in response to input torque from the engine 714 (via the planet carrier assembly 730) and/or the motor/generator 756 (via the sun gear 736), the differential transmission 725 can transfer power to the accessory drive output pulley 744 (via the ring gear 728) and thereby drive the accessories 750 at a selectable rate.

Still referring to FIG. 7, a first one-way clutch 760 is operatively connected to the engine crankshaft 716 and the stationary member 762 such that, when the engine 714 is in an off-state, the crankshaft 716 can be selectively restrained from rotating in a direction opposite of drive, and the motor/generator 756 can be implemented to drive the accessories 750 at a selectable rate. In addition, a selectable brake 764 is operatively connected to the planet carrier assembly 740 of the second planetary gear set 734 and the stationary member 762. By selectively connecting the planet carrier assembly 740 (and thus the sun gear 726, continuously connected thereto) with ground, power can be transmitted from the motor/generator 756 to both the accessory 750 (e.g. via sun gear 736, across ring gear 728, and down pulley 744 and drive belt 746) and the engine 714 (e.g., via sun gear 736, across ring gear 738 and planet carrier assembly 730, and down pulley 722 and drive belt 720) to fire the engine 714. Finally, a second one-way clutch 766 is disposed between and operatively connected to the carrier assembly 730 and the ring gear 728, both of the first planetary gear set 724. By actuating the second one-way clutch 766, the first planetary gear set 724 is forced to rotate as a single unit, thereby connecting the engine 714 directly to the accessory drive output pulley 744. In effect, the engine 714 bypasses the differential transmission 725 to drive the accessories 750 directly without input from the motor/generator 756.

Figure 8:
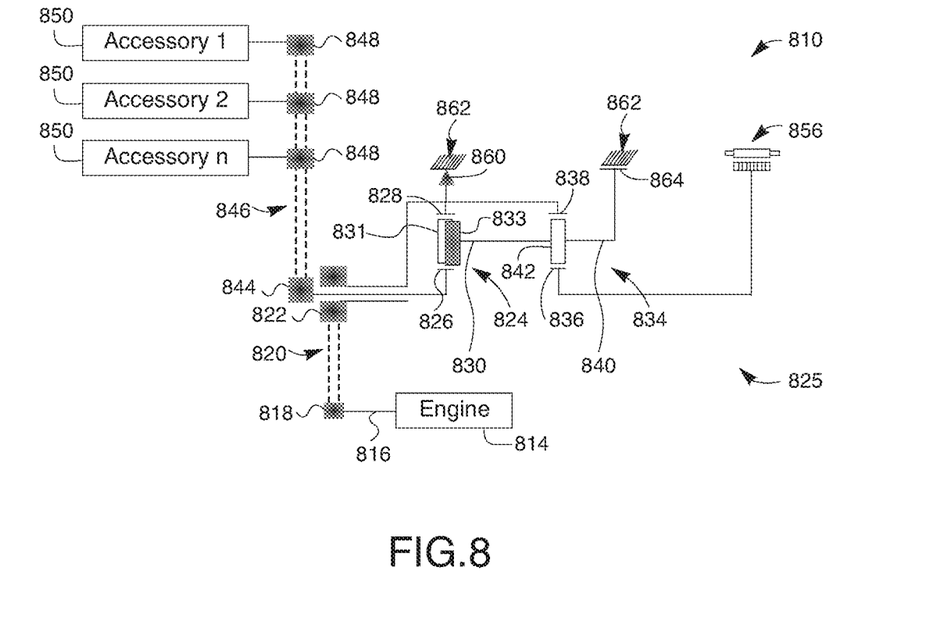
FIG. 8 is a schematic depiction of the accessory drive system of FIG. 1 in accordance with a sixth alternate embodiment of the present invention.

FIG. 8 of the drawings provides an accessory drive system 810 in accordance with yet another alternate embodiment of the present invention wherein the first planetary gear set 824 is preferably a compound planetary gear set. More specifically, the planet carrier assembly 830 has a double-pinion configuration with a first plurality of pinion gears 831 rotatably mounted thereon and meshingly engaged with the ring gear 828, and a second plurality of pinion gears 833 rotatably mounted thereon and meshingly engaged with the sun gear 826. However, the second planetary gear set 834 is depicted in FIG. 8 as a simple planetary gear set, wherein the planet carrier assembly 840 preferably has a single plurality of pinion gears 842 rotatably mounted thereon and meshingly engaged with both the ring gear 838 and sun gear 836.

The accessory drive input pulley 822 (which runs at a fixed ratio of engine speed) is operatively connected to the ring gear 828 of the first planetary gear set 824. The motor/generator 856 is operatively connected to the sun gear 836 of the second planetary gear set 834. The ring gear 828 of the first planetary gear set 824 is continuously connected to the ring gear 838 of the second planetary gear set 834, whereas the double-pinion carrier assembly 830 of the first planetary gear set 824 is continuously connected to single-pinion carrier assembly 840 of the second planetary gear set 834. Finally, the sun gear 826 of the first planetary gear set 824 is operatively connected to the accessory drive output pulley 844. Therefore, in response to input torque from the engine 814 (via the ring gear 828) and/or the motor/generator 856 (via the sun gear 836), the differential transmission 825, defined by the first and second planetary gear sets 824, 834, can transfer power to the accessory drive output pulley 844 (via the sun gear 826) and thereby drive the accessories 850 at a selectable rate.

Still referring to FIG. 8, a one-way clutch 860 is operatively connected to the ring gear 828 of the first planetary gear set 824 (and thus the ring gear 838, continuously connected thereto) and the stationary member 862. When the engine 814 is in an off-state, the ring gear 828, and thus the accessory drive input pulley 822 and crankshaft 816 can be selectively restrained via clutch 860 from rotating in a direction opposite of drive, and the motor/generator 856 can be implemented to drive the accessories 850 at a selectable rate. In addition, a selectable brake 864 is operatively connected to the planet carrier assembly 840 of the second planetary gear set 834 and the stationary member 862. By selectively connecting the planet carrier assembly 840 (and thus the planet carrier assembly 830, continuously connected thereto) with ground, power can be transmitted from the motor/generator 856 both to the accessories 850 and to the engine 814 to fire the engine 814. Contrary to the embodiments provided in FIGS. 2, 4, and 7, the accessory drive system 810 of FIG. 8 does not include the optional third torque transmitting device (e.g., one-way clutch 266, 466, and 766, respectively.)

Figure 9:
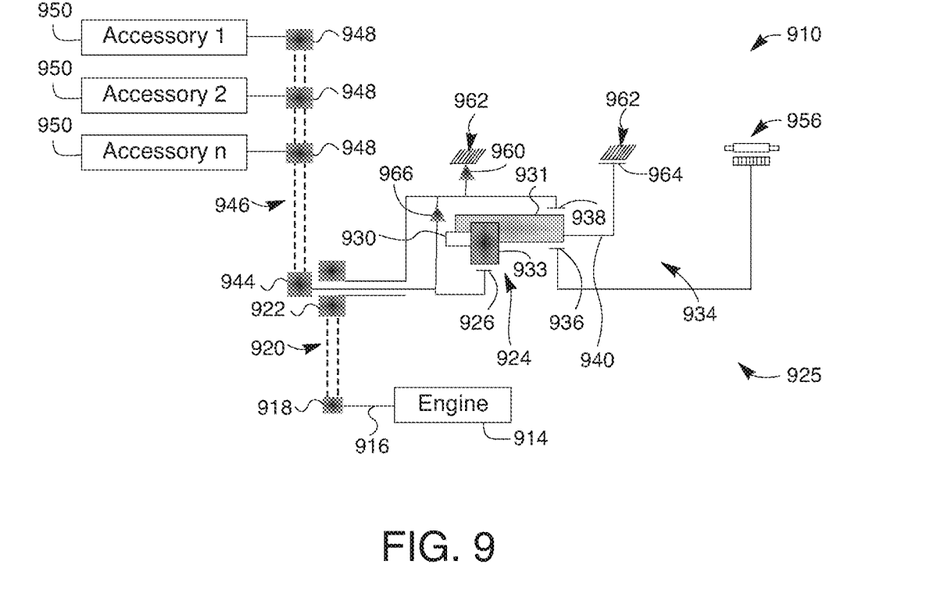
FIG. 9 is a schematic depiction of the accessory drive system of FIG. 1 in accordance with a seventh alternate embodiment of the present invention.

FIG. 9 of the drawings provides an accessory drive system 910 in accordance with yet another alternate embodiment of the present invention wherein the differential transmission 925 is defined by first and second gear sets 924, 934, respectively—the first gear set having a double-pinion carrier assembly 930 circumscribing a first sun gear 926, and the second gear set 934 having a ring gear 938 circumscribing a second sun gear 936 with a single-pinion carrier assembly 940 interposed therebetween. The double-pinion carrier assembly 930 of the first gear set 924 has a plurality of long pinion gears 931 rotatably mounted thereon and meshingly engaged with a plurality of short pinion gears 933, also rotatably mounted to the double-pinion carrier assembly 930, that are meshingly engaged with the first sun gear 926. The plurality of long pinion gears 931 are also rotatably mounted to the single-pinion carrier assembly 940 of the second gear set 934, and meshingly engaged with both the sun gear 936 and ring gear 938.

The accessory drive input pulley 922 (which runs at a fixed ratio of engine speed) is operatively connected to the ring gear 938 of the second gear set 934. The motor/generator 956 is operatively connected to the sun gear 936 of the second gear set 934. Additionally, the sun gear 926 of the first gear set 924 is operatively connected to the accessory drive output pulley 944. Therefore, in response to input torque from the engine 914 (via the ring gear 938) and/or the motor/generator 956 (via the sun gear 936), the differential transmission 925, defined by the first and second gear sets 924, 934, can transfer power to the accessory drive output pulley 944 (via the sun gear 926) and thereby drive the accessories 950 at a selectable rate.

Still referring to FIG. 9, a first one-way clutch 960 is operatively connected to the ring gear 938 of the second gear set 934 and the stationary member 962. When the engine 914 is in an off-state, the ring gear 938, and thus the accessory drive input pulley 922 and crankshaft 916 can be selectively restrained via clutch 960 from rotating in a direction opposite of drive, and the motor/generator 956 can be implemented to drive the accessories 950 at a selectable rate. Additionally, a selectable brake 964 is operatively connected to the planet carrier assembly 940 of the second gear set 934 and the stationary member 962. By selectively connecting the carrier assembly 940 (and thus the carrier assembly 930, continuously interconnected by the plurality of long pinion gears 931) with ground, power can be transmitted from the motor/generator 956 both to the accessory 950 and to the engine 914 to start/re-start the engine 914. Finally, a second one-way clutch 966 is disposed between and operatively connected to the sun gear 926 of the first gear set 924 and the ring gear 938 of the second gear set 934. By actuating the second one-way clutch 966, the engine 914 bypasses the differential transmission 925 to drive the accessories 950 directly without input from the motor/generator 956.

While the best modes for carrying out the present invention have been described in detail herein, those familiar with the art to which this invention pertains will recognize various alternative designs and embodiments for practicing the invention within the scope of the appended claims.

The invention claimed is:

1. A controllable speed accessory drive system for a motorized vehicle, comprising:
    a first gear set having a first member, a second member, and a third member, wherein said first member, said second member and said third member of said first gear set include a ring gear member, a sun gear member, and a planetary carrier assembly in any order;
    a second gear set having a first member, a second member, and a third member, wherein said first member, said second member and said third member of said second gear set include a ring gear member, a sun gear member, and a planetary carrier assembly in any order;
    wherein said first member, said second member and said third member of said first gear set are separate and independent from said first member, said second member and said third member of said second gear set;
    wherein said first member of said first gear set is directly connected with said first member of said second gear set, and wherein said second member of said first gear set is directly connected with said second member of said second gear set;
    at least one accessory operatively connected to one of said members of said gear sets;
    an engine having an engine output shaft operatively connected to one of said members of said gear sets other than said member of said gear sets operatively connected to said at least one accessory to permit said at least one accessory to be driven by said engine;
    a motor/generator operatively connected to one of said members of said gear sets other than said members of said gear sets operatively connected to said engine and said at least one accessory, said motor/generator being configured to drive said at least one accessory at a selectable rate independent of engine speed;
    a first torque transmitting device operatively connected to one of said members of said gear sets other than said members of said gear sets operatively connected to said engine and said motor/generator, said first torque transmitting device configured to allow said motor/generator to re-start said engine and simultaneously power said at least one accessory; and
    a second torque transmitting device operatively connected to said engine output shaft and not directly connected to said member of said gear sets operatively connected to said first torque transmitting device, said second torque transmitting device configured to provide a reaction torque necessary to allow said motor/generator to power said at least one accessory at a selectable rate while said engine is off.

2. The accessory drive system of claim 1, wherein said planet carrier assembly is one of a single-pinion carrier assembly and a double-pinion carrier assembly.

3. The accessory drive system of claim 2, wherein said first torque transmitting device is a selectively engageable brake and said second torque transmitting device is a one-way clutch.

4. The accessory drive system of claim 2, further comprising:
    a controller operatively connected to said engine and said motor/generator, said controller being configured to control the speed of said motor/generator in order to optimize the speed at which said at least one accessory is run.

5. The accessory drive system of claim 2, further comprising:
    a plurality of pulleys configured to transfer power from said engine and said motor/generator to said at least one accessory.

6. The accessory drive system of claim 2, wherein said motor/generator is operatively connected to said one of said members of said gear sets via one of a shaft, a belt and pulley assembly, a chain and sprocket assembly, and a third gear set.

7. The accessory drive system of claim 2, further comprising:
    an energy storage device operatively connected to said motor/generator, said energy storage device being configured to supply power to or receive power from said motor/generator.

8. An accessory drive system for a hybrid vehicle comprising:
    a first gear set having a first member, a second member, and a third member, wherein said first member, said second member and said third member of said first gear set include a ring gear member, a sun gear member, and a planetary carrier assembly in any order;
    a second gear set having a first member, a second member, and a third member, wherein said first member, said second member and said third member of said second gear set include a ring gear member, a sun gear member, and a planetary carrier assembly in any order;
    wherein said first member, said second member and said third member of said first gear set are separate and independent from said first member, said second member and said third member of said second gear set;
    wherein said first member of said first gear set is directly connected with said first member of said second gear set, and wherein said second member of said first gear set is directly connected with said second member of said second gear set;
    wherein said planet carrier assembly of said first gear set and said second gear set is one of a single-pinion carrier assembly and a double-pinion carrier assembly;

an engine having an engine output shaft operatively connected to one of said members of said first and second gear sets;

a motor/generator operatively connected to one of said members of said gear sets other than said members of said gear sets operatively connected to said engine;

at least one accessory operatively connected to one of said members of said gear sets other than said members of said gear sets operatively connected to said engine and said motor/generator;

a first torque transmitting device operatively connected to one of said members of said gear sets other than said members of said gear sets operatively connected to said engine, said motor/generator, and said accessory;

a second torque transmitting device operatively connected to said engine output shaft and not directly connected to said member of said gear sets operatively connected to said first torque transmitting device; and a controller operatively connected to said engine and said motor/generator, said controller being configured to control the speed of said motor/generator in order to optimize the speed at which said at least one accessory is run.

9. The accessory drive system of claim 8, wherein said first and second torque transmitting devices are one of a one-way clutch and a selectively engageable brake.

10. The accessory drive system of claim 8, wherein said first torque transmitting device is a selectively engageable brake and said second torque transmitting device is a one-way clutch.

11. The accessory drive system of claim 8, further comprising:

a plurality of pulleys configured to transfer power from said engine and said motor/generator to said at least one accessory.

12. The accessory drive system of claim 8, wherein said motor/generator is operatively connected to said one of said members of said gear sets via one of a shaft, a belt and pulley assembly, a chain and sprocket assembly, and a third gear set.

* * * * *